(12) United States Patent
Asada

(10) Patent No.: US 8,097,200 B2
(45) Date of Patent: Jan. 17, 2012

(54) PROCESS FOR PRODUCING STRETCHED FILM, STRETCHED FILM, POLARIZER, AND LIQUID-CRYSTAL DISPLAY

(75) Inventor: Takeshi Asada, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 12/680,109

(22) PCT Filed: Sep. 11, 2008

(86) PCT No.: PCT/JP2008/066375
§ 371 (c)(1),
(2), (4) Date: Mar. 25, 2010

(87) PCT Pub. No.: WO2009/041273
PCT Pub. Date: Apr. 2, 2009

(65) Prior Publication Data
US 2010/0255220 A1 Oct. 7, 2010

(30) Foreign Application Priority Data
Sep. 26, 2007 (JP) ................. 2007-248699

(51) Int. Cl.
*B29C 55/00* (2006.01)
*B29D 7/01* (2006.01)
*C09K 19/00* (2006.01)

(52) U.S. Cl. ........ 264/291; 264/1.34; 264/1.35; 264/1.6; 264/2.7; 264/210.1; 264/210.7; 264/288.4; 264/288.8; 264/290.2; 428/1.3

(58) Field of Classification Search .................. None
See application file for complete search history.

(56) References Cited

U.S. PATENT DOCUMENTS

| | | | | |
|---|---|---|---|---|
| 2,505,146 A | * | 4/1950 | Ryan | 264/288.4 |
| 4,554,713 A | * | 11/1985 | Chabal | 26/51 |
| 5,039,471 A | * | 8/1991 | Yokota et al. | 264/280 |
| 6,746,633 B2 | | 6/2004 | Sakamaki et al. | |
| 7,023,505 B2 | * | 4/2006 | Sakamaki et al. | 349/96 |
| 7,099,082 B2 | * | 8/2006 | Kawanishi et al. | 359/499 |
| 2006/0214319 A1 | * | 9/2006 | Kazama | 264/1.34 |
| 2007/0228586 A1 | * | 10/2007 | Merrill et al. | 264/1.34 |

FOREIGN PATENT DOCUMENTS

| | | |
|---|---|---|
| JP | 2002-86554 A | 3/2002 |
| JP | 2003-207629 A | 7/2003 |
| JP | 2003-232928 A | 8/2003 |
| JP | 2004-9543 A | 1/2004 |
| JP | 2006-159775 A | 6/2006 |
| JP | 2007-203556 A | 8/2007 |
| JP | 2007-210281 A | 8/2007 |
| JP | 2008-238514 A | 10/2008 |
| JP | 2009-78474 A | 4/2009 |

* cited by examiner

*Primary Examiner* — Jeffrey Wollschlager
(74) *Attorney, Agent, or Firm* — Birch, Stewart, Kolasch & Birch, LLP (57) ABSTRACT

A method for producing a stretched film comprising supplying a film composed of a thermoplastic resin along a direction D1 that is different from a taking-up direction D2 of a post-stretch film, and obliquely stretching the film while transferring the film with the edges thereof being gripped by gripping devices, to produce the stretched film having an orientation angle $\theta$ being within $45\pm5°$ with respect to the taking-up direction.

8 Claims, 1 Drawing Sheet

FIG.1

PROCESS FOR PRODUCING STRETCHED FILM, STRETCHED FILM, POLARIZER, AND LIQUID-CRYSTAL DISPLAY

TECHNICAL FIELD

The present invention relates to a method for producing a stretched film, the stretched film, a polarization plate and a liquid crystal display device.

BACKGROUND ART

A variety of phase difference films are used in a liquid crystal display device for enhancing its performance. The phase difference films are laminated so that the slow axis thereof is inclined at a variety of certain angles with respect to the polarization transmission axis of a polarizer in order to sufficiently exert its function, and the laminate is installed in the liquid crystal display device. The inclination angle of the slow axis with respect to the transmission axis of the polarizer is often neither a parallel angle nor a perpendicular angle. The conventional phase difference film is produced by stretching in a lengthwise or crosswise direction. Due to this principle, the angle of the slow axis with respect to the lengthwise direction of the film can not be other than 0° or 90°. The aforementioned laminate thus has been produced by a batch method in which film pieces that have cut out from a long roll at a certain angle are bonded one by one. Addressing to this inconvenience, there have been proposed a variety of methods for producing a lengthy phase difference film wherein the film is obliquely stretched at a desired angle whereby the direction of the slow axis of the film can be flexibly controlled to any direction that is other than 0° nor 90° with respect to the lengthwise direction. Employment of this obliquely stretched film enables bonding of the films not with the conventional batch method but with a roll-to-roll method, which therefore realizes remarkable improvement in productivity.

For example, JP 2002-86554-A (corresponding to U.S. Pat. No. 6,746,633) discloses a method for stretching an optical polymer film wherein a continuously-supplied polymer film is held at both edges thereof with holding means which are driven along the lengthwise direction of the film for applying a tensile strength to the film for achieving stretching, wherein the stretching is performed under the conditions of that a locus L1 of the holding unit on one edge of the polymer film from a substantial holding commencement point to a substantial release point, a locus L2 of the holding unit on the other edge of the polymer film from a substantial holding commencement point to a substantial release point, and a distance W between the two substantial release points satisfy a relationship of |L2−L1|>0.4W, that a supporting property of the polymer is kept, and that a volatilization fraction is 5% or more, and then the volatilization fraction is reduced with being shrunk.

JP 2003-232928-A discloses a method for producing a lengthy optical film which is obtained by stretching a lengthy film composed of a thermoplastic resin and the optical axis (orientation axis) of which is in a direction that is neither parallel nor perpendicular to a taking-up direction of the lengthy film, wherein in a region in which the film is substantially stretched, moving rates of opposed edges of the film in a width direction are equal while moving distances thereof are different, and a pair of fixtures hold both edges of the film in the width direction, at least one of which moves on a rail having a wave shape with respect to a film surface upon being stretched. It is stated in the same publication that this stretching step may be repeated several times, and this stretching step may be performed after preparative stretching in a lengthwise or crosswise direction.

JP 2004-9543-A discloses a structure of a tenter apparatus for oblique stretching. In that disclosure, there is a description of an obliquely stretched film that is stretched so that an angle α made by film clips and a tenter rail margin becomes an orientation angle of the film.

However, with such a deformation that is much like a shearing in an oblique direction with respect to the traveling direction, the phase difference film formed thereby would have a reduced cohesion force in a thickness direction. Such a film tends to have breakage on the surface layer thereof. If such an obliquely-stretched film is bonded as a protection film on one side to a polarizer, the durability of the resulting polarization plate is remarkably reduced. This is because changes in temperature and humidity cause stress in the vicinity of the bonded interface with the polarizer which readily causes breakage of the phase difference film on the surface thereof, which in turn causes delamination of the film off the polarizer. A liquid crystal display device having such a polarization plate tends to have insufficient ability to maintain good display property over the long period of time.

Thus, it is an object of the present invention to realize production of an obliquely stretched film in which reduction in the cohesion force in the thickness direction of the film is suppressed and in which breakage is also suppressed. It is another object of the present invention to provide a polarization plate having excellent durability, and a liquid crystal display device that can maintain good display property for a long period of time.

DISCLOSURE OF INVENTION

In order to achieve the aforementioned object, the present inventors have performed study on the method for producing an obliquely stretched film with a tenter, as to the positional relationship of the left and right grippers at the stretching completion point, and the speed for stretching. As a result, they have found out that an obliquely stretched film with high durability is obtainable when an orientation angle θ of the film with respect to the taking-up direction, and an angle θL between two directions, one of which is along a straight line connecting a pair of the gripping devices when they are at a stretching completion point, the pair of the gripping devices having been opposed to each other along a direction that is approximately perpendicular to a film supplying direction when the pair has been at a point of film gripping commencement by the gripping devices, and the other of which is a direction perpendicular to the taking-up direction, are in a specific range of relationship between θL and θ, and when the stretching speed V (mm/min) is in a specific range. It is also found out that, measuring the relationship between θL and θ and stretching speed, the θL and θ are out of the aforementioned specific relationship or the stretching speed is out of the aforementioned specific range in the prior art methods. The present inventors completed the present invention on the basis of these findings.

That is, according to a first aspect of the present invention, there is provided a method for producing a stretched film comprising: supplying a film composed of a thermoplastic resin along a direction that is different from a taking-up direction of a post-stretch film, and obliquely stretching the film while transferring the film with the edges thereof being gripped by gripping devices, to produce the stretched film having an orientation angle θ being within 45±5° with respect to the taking-up direction, wherein the stretching is performed so that an angle θL (°) and a stretching speed V (mm/min) satisfy the following formulae (1) and (2):

$$\theta-20° \leq \theta L \leq \theta-3° \quad (1)$$

$$1000 \text{ mm/min} < V < 2500 \text{ mm/min} \quad (2)$$

wherein the angle θL is an angle between two directions, one of which is along a straight line connecting a pair of the gripping devices when they are at a stretching completion point, the pair of the gripping devices having been opposed to each other along a direction that is approximately perpendicular to a film supplying direction when the pair has been at a point of film gripping commencement by the gripping devices, and the other of which is a direction perpendicular to the taking-up direction.

In the method for producing the stretched film according to the first aspect of the present invention, the thermoplastic resin may be those having a weight average molecular weight of 15,000 to 50,000.

According to a second aspect of the present invention, there is provided a stretched film produced using the method for producing the stretched film according to the first aspect of the present invention.

According to a third aspect of the present invention, there is provided a polarization plate comprising a polarizer and the stretched film according to the second aspect of the present invention laminated on at least one side of the polarizer.

According to a fourth aspect of the present invention, there is provided a liquid crystal display device comprising the polarization plate according to the third aspect of the present invention.

According to the method for producing the stretched film of the present invention, it is possible to produce an obliquely stretched film with suppressed reduction of the cohesion force in the film thickness direction, and with small tendency of breakage. Since the polarization plate of the present invention employs the obliquely stretched film having small tendency of breakage that has produced by the method of the present invention, the polarization plate has an excellent durability. Since the liquid crystal display device of the present invention employs the polarization plate of the present invention having an excellent durability, the device can maintain good display properties for a long period of time.

BEST MODE FOR CARRYING OUT THE INVENTION

The method for producing the stretched film according to the embodiment of the present invention will be described in detail below. This method is a method for producing the stretched film comprising supplying a lengthy film composed of a thermoplastic resin (an unstretched film or a stretched film which has been subjected to uniaxial or biaxial stretching in lengthwise or crosswise direction) along a direction that is different from a taking-up direction of a post-stretch film, and obliquely stretching the film in an oven while transferring the film with the edges thereof being gripped by gripping devices of a tenter for oblique stretching (oblique stretching apparatus), to produce a stretched firm having an orientation angle θ being within 45±5° with respect to the taking-up direction.

The stretching is performed so that an angle θL(°) and a stretching speed V (mm/min) satisfy the following formulae (1) and (2)

$$\theta-20° \leq \theta L \leq \theta-3° \quad (1)$$

$$1000 \text{ mm/min} < V < 2500 \text{ mm/min} \quad (2)$$

wherein the angle θL is an angle between two directions, one of which is along a straight line connecting a pair of the gripping devices when they are at a stretching completion point, the pair of the gripping devices having been opposed to each other along a direction that is approximately perpendicular to a film supplying direction when the pair has been at a point of film gripping commencement (i.e., an inlet of the tenter) by the gripping devices, and the other of which is a direction perpendicular to the taking-up direction. After the completion of the stretching, the film released from the gripping devices of the tenter is trimmed at both edges (both sides) thereof and then taken up to a winding core (taking-up roll).

The lengthy film herein refers to a film having a length that is about 5 times or more with respect to the width of the film, preferably having a length that is 10 times or more and specifically a film having a length to an extent so that the film is taken up and stored or transported in a form of a roll.

(1) Thermoplastic Film

Examples of the thermoplastic film that composes the obliquely stretched film in the present embodiment may include polycarbonate, polyester, polyether sulfone, polyarylate, polyimide and alicyclic polyolefin resins. Among them, the alicyclic polyolefin resin is preferable. Particularly, an alicyclic polyolefin resin having an alicyclic structure in its main chain is preferable in terms of mechanical strength and heat durability.

Examples of the alicyclic structure in the alicyclic polyolefin resin may include a saturated alicyclic hydrocarbon (cycloalkane) structure and an unsaturated alicyclic hydrocarbon (cycloalkene) structure, and the cycloalkane structure is preferable in terms of mechanical strength and heat resistance. There is no particular limitation on the number of carbon atoms that constitutes the alicyclic structure, although the number is usually 4 to 30, preferably 5 to 20, and more preferably 5 to 15 because thereby the mechanical strength, heat durability and shape-forming ability are well balanced, thus being preferable.

The percentage of the repeating unit having an alicyclic structure that composes the alicyclic polyolefin resin is preferably 55% by weight or more, more preferably 70% by weight or more and particularly preferably 90% by weight or more. The ratio of the repeating unit having the alicyclic structure in the alicyclic polyolefin resin in this range is preferable in terms of transparency and heat durability.

Examples of the alicyclic polyolefin resin may include norbornene-based resins, monocyclic olefin-based resins, cyclic conjugate diene-based resins, vinyl alicyclic hydrocarbon-based resin and hydrogenated products thereof. Among them, the norbornene-based resin is preferably used because of its excellent transparency and shape-forming ability.

Examples of the norbornene-based resins may include a ring-opening polymer of a monomer having a norbornene structure or a ring-opening copolymer of a monomer having a norbornene structure with another monomer(s), or hydrogenated products thereof; an addition polymer of a monomer having a norbornene structure or an addition copolymer of a monomer having a norbornene structure with another monomer(s), or hydrogenated products thereof. Among them, the hydrogenated product of the ring-opening (co)polymer of a monomer having a norbornene structure is particularly preferably used in terms of its transparency, shape-forming ability, heat durability, low moisture absorption property, size stability and light weight.

Examples of the monomer having a norbornene structure may include bicyclo[2.2.1]hepto-2-ene (trivial name: norbornene), tricyclo[4.3.0.1$^{2,5}$]deca-3,7-diene (trivial name: dicyclopentadiene), 7,8-benzotricyclo[4.3.0.1$^{2,5}$]deca-3-ene (trivial name: methanotetrahydrofluorene), tetracyclo[4.4.0.1$^{2,5}$.1$^{7,10}$]dodeca-3-ene (trivial name: tetracyclododecene) and derivatives of these compounds (e.g., those having a substituent(s) on the ring). Examples of the substituent may include alkyl, alkylene and polar groups. A plurality of the substituents that may be the same or different may be bound to the ring. One species of the monomer having a norbornene structure may be used alone, or two or more species thereof may be used in combination.

Examples of the classes of the polar group may include heteroatoms or an atomic group having the heteroatoms. Examples of the heteroatoms may include an oxygen atom, a nitrogen atom, a sulfur atom, a silicon atom and a halogen atom. Specific examples of the polar groups may include carboxyl, carbonyloxycarbonyl, epoxy, hydroxyl, oxy, ester, silanol, silyl, amino, nitrile and sulfone groups. In order to obtain a film with small saturated water absorption ratio, it is preferable to contain small amount of the polar group, and it is more preferable to contain no polar group.

Examples of another monomer that is ring-opening copolymerizable with the monomer having a norbornene structure may include monocyclic olefins such as cyclohexene, cycloheptene and cyclooctene and derivatives thereof; as well as cyclic conjugate diene such as cyclohexadiene and cycloheptadiene and derivatives thereof.

The ring-opening polymer of the monomer having a norbornene structure and the ring-opening copolymer of the monomer having a norbornene structure with another copolymerizable monomer may be obtained by (co)polymerizing the monomer(s) in the presence of a publicly known catalyst for ring-opening polymerization.

Examples of the monomer that is addition copolymerizable with the monomer having a norbornene structure may include α-olefin such as ethylene, propylene and 1-butene having 2 to 20 carbon atoms and derivatives thereof; cycloolefin such as cyclobutene, cyclopentene and cyclohexene and derivatives thereof; non-conjugate diene such as 1,4-hexadiene, 4-methyl-1,4-hexadiene and 5-methyl-1,4-hexadiene. One species of these monomers may be used alone, or two or more species thereof may be used in combination. Among them, α-olefin is preferable, and ethylene is more preferable.

The addition polymer of the monomer having a norbornene structure and the addition copolymer of the monomer having a norbornene structure with another copolymerizable monomer may be obtained by polymerizing the monomer(s) in the presence of the publicly known catalyst for addition polymerization.

The hydrogenated product of the ring-opening polymer of the monomer having a norbornene structure, the hydrogenated product of the ring-opening copolymer of the monomer having a norbornene structure with another monomer copolymerizable therewith, the hydrogenated product of the addition polymer of the monomer having a norbornene structure, and the hydrogenated product of the addition copolymer of the monomer having a norbornene structure with another monomer copolymerizable therewith may be obtained by adding a publicly known hydrogenation catalyst containing a transition metal such as nickel or palladium to a solution of the ring-opening (co)polymer or the addition (co)polymer, to carry out contacting with hydrogen so that preferably 90% or more of carbon-carbon unsaturated bonds are hydrogenated.

Among the norbornene-based resins, preferable are those having X: a bicyclo[3.3.0]octane-2,4-diyl ethylene structure and Y: a tricyclo[4.3.0.1$^{2,5}$]decane-7,9-diyl ethylene structure as the repeating units, in which the content of these repeating units is 90% by weight or more based on the entire repeating units in the norbornene-based resin and the containing ratio of X to Y is 100:0 to 40:60 by weight. Using such a resin, an optical film having stable optical properties without size deformation over long period of time is obtainable.

The molecular weight of the alicyclic polyolefin resin suitably used for the present invention is appropriately selected depending on the intended use, and is preferably 15,000 to 50,000, more preferably 18,000 to 45,000 and particularly preferably 20,000 to 40,000 as a weight average molecular weight (Mw) in terms of polyisoprene (polystyrene when the solvent is toluene) measured by gel permeation chromatography using cyclohexane as the solvent (when the resin is not dissolved, toluene is used). Having the weight average molecular weight in this range, mechanical strength and shape-forming ability of the film is well balanced, thus being preferable.

The molecular weight distribution (weight average molecular weight (Mw)/number average molecular weight (Mn)) of the alicyclic polyolefin resin suitably used for the present invention is not particularly limited, and usually ranges from 1.0 to 10.0, preferably 1.1 to 4.0 and more preferably 1.2 to 3.5.

The glass transition temperature of the thermoplastic resin may be appropriately selected depending on the intended use, and is preferably 80° C. or above and more preferably in a range of 100 to 250° C. The film composed of the thermoplastic resin having a glass transition temperature in such a range is excellent in durability without causing a deformation and a stress even at a high temperature.

In the thermoplastic resin, the absolute value of the photoelastic coefficient is preferably $10 \times 10^{-12}$ Pa$^{-1}$ or less, more preferably $7 \times 10^{-12}$ Pa$^{-1}$ or less and particularly preferably $4 \times 10^{-12}$ Pa$^{-1}$ or less. The photoelastic coefficient C is a value obtained by dividing a birefringence Δn by a stress σ, i.e., is a value represented by C=Δn/σ. When the photoelastic coefficient is more than $10 \times 10^{-12}$ Pa$^{-1}$ fluctuation of the in-plane retardation in the stretched film is likely to be increased.

The lengthy thermoplastic resin film may be obtained by a publicly known method, e.g., a cast molding method, an injection molding method and an inflation molding method. Among them, the injection molding method is preferable because the amount of the residual volatile component is small and size stability is excellent. This thermoplastic resin film may be a monolayer film or a laminated film of two or more layers. The laminated film may be obtained by the publicly known method, e.g., a coextrusion molding method, a film lamination method and an application method. Among them, the coextrusion method is preferable. As to the thermoplastic resin film, the fluctuation of the film thickness is preferably 5% or less and more preferably 4% or less with respect to the mean thickness. The fluctuation of the film thickness is a value obtained by subtracting a minimum value from a maximum value among values obtained by measuring the thickness of the thermoplastic resin film at equal intervals in a width direction. The mean thickness is a mean value of the values obtained by measuring the thickness of the thermoplastic resin film at equal intervals in the width direction.

(2) Method for Producing Obliquely Stretched Film

The production of the obliquely stretched film in the present embodiment is performed using a tenter for oblique stretching. The tenter for oblique stretching is an apparatus in which the width of a film supplied from a film roll (supply roll) is extended in an oblique direction with respect to its traveling direction (the direction along which the midpoint of the film in the width direction moves) under an environment heated by an oven. This tenter for oblique stretching comprises an oven, a pair of rails for left and right edges, on which gripping devices for transferring the film run, and a large number of gripping devices that run on the rails. The film is sent out of the film roll and continuously supplied to an inlet of the tenter where both edges of the film are gripped by the gripping devices. The film is introduced to the inside of the oven. The film is released at an outlet of the tenter. The film released from the gripping devices is taken up to the winding core. Each rail of the rail pair has an endless continuous rail track, and the gripping devices that have released the film at the outlet of the tenter run on the outside track for sequentially returning to the inlet.

Shapes of the left and right rails in the tenter are asymmetric depending on the orientation angle and the stretching ratio given to the stretched film to be produced. The shapes are fine-tunable manually or automatically. In this embodiment, the lengthy thermoplastic film is stretched, and the orientation angle θ can be set to any angle within the range of 45±5°, i.e., the range of 40 to 50° with respect to the taking-up direction after being stretched. In this embodiment, the gripping devices of the tenter run at a constant speed keeping constant intervals with the preceding and following gripping devices. However, the running speed of the gripping devices on the left and right side may be set to be different from each other in relation to the shapes of the left and right rail tracks.

Figure 1:
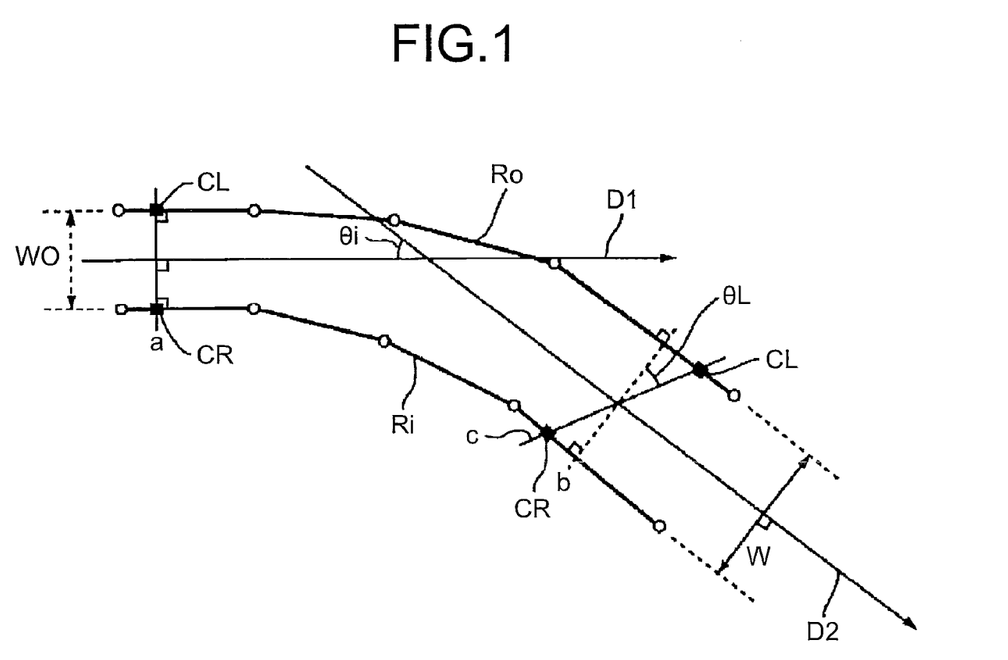
FIG. 1 is a view showing an example of a rail arrangement of a tenter for obliquely stretching according to an embodiment of the present invention.

FIG. 1 shows the rail tracks (rail pattern) of the tenter in an embodiment of the present invention. The supplying direction D1 of the thermoplastic resin film is different from the taking-up direction (MD direction) D2 for taking up the film after being stretched (product), which enables capability of obtaining a wide and uniform optical property even in the obliquely stretched film having a relatively large orientation angle. The supplying angle θi is an angle made by the supplying direction D1 of the film before being stretched and the taking-up direction D2 of the film after being stretched. In the present invention, in order to produce the film having the orientation angle of 40 to 50° as described above, the supplying angle θi is set to 30°<θi<60°, and more preferably 40°<θi<50°. Setting the angle in such a range results in better (smaller) fluctuation of the optical properties along the width direction of the produced film.

The thermoplastic resin film supplied from the film roll (supply roll) is sequentially gripped at both edges thereof with the left and right gripping devices at the inlet (at the position of legend (a)) of the tenter, and forced to run with running gripping device. The right and left gripping devices CR and CL are opposed (faced) in an approximately perpendicular direction with respect to the traveling direction (supplying direction D1) of the film at the inlet (at the position of legend (a)) of the tenter. The gripping devices run on the left and right rails Ro and Ri that are asymmetric. At the position where stretching is completed (at the position of legend (b)), the gripping devices are not opposed in a perpendicular direction (TD direction) with respect to the traveling direction (taking-up direction D2) of the film, and they have a relationship in which the left CL goes forward and the right CR goes backward.

That is, at the inlet (a) of the tenter (at the position where gripping with the gripping devices are commenced), the gripping devices CL and CR are mutually opposed in the approximately perpendicular direction with respect to the supplying direction D1 of the film. When the film is present at the position (b) where the stretching is completed, a straight line (c) connecting the gripping devices CL and CR is inclined at an angle of θL(°) with respect to an approximately orthogonal direction (TD direction) to the taking-up direction (film traveling direction) D2. θL is herein set to be in the range of θ−20°≦θL≦θ−3° and preferably θ−15°≦θL≦θ−5° with respect to the orientation angle. If θL>θ−3°, the strength of the stretched film along the thickness direction may be weakened. If θ−20°>θL, it may become difficult to achieve intended suppression of fluctuation of the orientation angle θ. Being "approximately perpendicular" herein refers to that the angle made by the straight line connecting the aforementioned gripping devices CL and CR and the supplying direction D1 of the film is within 90±1°.

The value θL may be altered by giving a take-up tensile force of the film at the outlet of the tenter, or previously giving a certain degree of a molecular orientation in a lengthwise or a crosswise direction to the film before being obliquely stretched.

The take-up tensile force T(N/m) at the outlet of the tenter may be appropriately adjusted in a range of 100 N/m<T<400 N/m and preferably 150 Nm<T<350 N/m, because the take-up tensile force out of the aforementioned range tends to cause slacks and wrinkles of the film, which may result in unpreferable deterioration in the retardation and a orientation axis profile in the TD direction.

In the obliquely stretching step, the stretching speed V (mm/min) has to be controlled in a range of 1000 mm/min<V<2500 mm/min and preferably 1200 mm/min<V<2300 mm/min. When the stretching speed V is 2500 mm/min or more, the strength in the thickness direction of the stretched film may be reduced. When the stretching speed V is 1000 nn/min or less, fluctuation of the orientation angle along the width direction may become unpreferably large.

In the obliquely stretching step, the stretching ratio R (W/W0) is preferably 1.3 to 3.0 and more preferably 1.5 to 2.8. The stretching ratio R in this range is preferable because thickness unevenness along the width direction may be thereby reduced. The stretching temperature may be set with variation along the width direction in the stretching zone of the tenter, whereby the thickness unevenness along the width direction may be controlled to a better level. W0 and W represent the width of the film before and after being obliquely stretched, respectively.

The stretching temperature in the stretching zone of the tenter with respect to the glass transition temperature Tg(° C.) of the thermoplastic resin is appropriately selected in the range of Tg to Tg+30(° C.). That is because the stretching temperature of less than Tg may result in insufficient shape-forming ability and occurrence of defect such as craze, whereas the stretching temperature of more than Tg+30° C. may result in flow stretching whereby sufficient molecular orientation for causing Re may not be obtained.

The film after being obliquely stretched is released from the gripping with the gripping devices, and discharged from the outlet of the tenter. After being trimmed at both edges, the film is sequentially taken up to the winding core (winding roll), to become a wound roll of the stretched film.

(3) Obliquely Stretched Film Produced by the Aforementioned Method

The stretched film of the present embodiment produced by the aforementioned production method may have a mean in-plane retardation Re of about 100 to 300 nm. The optimal value may be selected in this range depending on a design of the display device which employs this stretched film. Re is a value obtained by multiplying a mean thickness d of the film by a difference between a refractive index nx in an in-plane slow axis direction and a refractive index ny in an in-plane direction orthogonal to the slow axis, i.e., Re=(nx−ny)×d.

The orientation angle θ of the stretched film of the present embodiment is in the range of 45±5° with respect to the taking-up direction of the film being 0°. As with the in-plane retardation value, the optimal value may be selected in this range depending on the design of the display device used. It is preferable that the fluctuation of the orientation angle θ in the stretched film of the present embodiment is 1.0° or less over the width direction of at least 1300 mm. This is because, when the circular polarization plate is produced by laminating the film having fluctuation of the orientation angle θ being more than 1.0° with the polarization plate and the circular polarization plate is then installed in the liquid crystal display device, light leaking may occur and the contrast of the display may thereby deteriorated.

The fluctuation of the in-plane retardation Re in the stretched film of the present embodiment is preferably within 5 nm, more preferably within 4 nm and particularly preferably within 3 nm along the width direction over at least 1300 mm. Keeping the fluctuation of the in-plane retardation Re within the aforementioned range may result in good displaying quality when the film is used as a phase difference film for the liquid crystal display device.

The stretched film of the present embodiment preferably has an Nz coefficient that is calculated by (nx−nz) (nx−ny) being in the range of 1.0 to 2.5, wherein nx is the refractive index in the in-plane slow axis direction of the film, ny is the refractive index in the direction orthogonal to the in-plane slow axis direction of the film and nz is the refractive index in the thickness direction. The optimal value is selected in this range depending on the design of the display device used. The fluctuation of the Nz coefficient of the stretched film of the present embodiment is preferably 0.10 or less and more preferably 0.080 or less over at least 1300 mm in the width direction. This is because the fluctuation of the Nz coefficient exceeding 0.10 may become a cause of display quality deterioration such as color unevenness when the film is incorporated into the display device.

The mean thickness in the stretched film of the present embodiment is preferably 20 to 80 μm, more preferably 30 to 60 μm and particularly preferably 30 to 40 μm in terms of mechanical strength and other properties. The thickness unevenness along the width direction is preferably 3 μm or less and particularly preferably 2 μm or less because the thickness unevenness affects availability of the film to be taken up to the roll.

The stretched film of the present embodiment has a content of the residual volatile component at preferably 0.1% by weight or less, more preferably 0.05% by weight or less and still more preferably 0.02% by weight or less. That is because, if the film contains too much residual volatile component, the optical properties thereof may be changed over the lapse of time. By adjusting the content of the volatile component within the aforementioned range, the size stability of the film is improved, and changes in in-plane retardation Re and thickness direction retardation Rth (=(nx+ny)/2−nz)×d; wherein nx is the refractive index in the in-plane slow axis direction; ny is the refractive index in the direction orthogonal to the in-plane slow axis direction of the film; nz is the refractive index in the thickness direction; and d is the mean film thickness) over time may be reduced, whereby degradation of the circular polarization plate or the liquid crystal display device employing this stretched film may be reduced, which results in keeping the display image in good state for a long period of time.

The volatile component is a substance that is contained in a trace amount in the film having a molecular weight of 200 or less, and examples thereof may include residual monomers and solvents. The content of the volatile components may be quantified as a total amount of the substances having a molecular weight of 200 or less contained in the film by dissolving the film in chloroform and analyzing the solution with gas chromatography.

A saturated water absorption ratio of the stretched film of the present embodiment is preferably 0.03% by weight or less, more preferably 0.02% by weight or less and particularly preferably 0.01% by weight or less. Having the saturated water absorption ratio within the aforementioned range, changes in Re and Rth over time may be reduced, whereby degradation of the circular polarization plate or the liquid crystal display device employing this stretched film may be reduced, which results in keeping the display image in good state for a long period of time. The saturated water absorption ratio is a value represented by a percentage of an increased weight after immersing a test piece of the film in water at 23° C. for 24 hours based on a weight of the test piece before being immersed.

(4) Use of Stretched Film

The stretched film of the present embodiment capable of being obtained easily by the aforementioned production method of the present embodiment is practically applicable, as it is or in combination with other members, to use for a phase difference plate and a viewing angle compensation film in display devices such as liquid crystal display devices, organic EL display devices, plasma display devices, FED (field emission display) display devices and SED (surface-conduction electron emitter display) display devices.

The polarization plate of the present invention is constituted by laminating the obliquely stretched film produced using the aforementioned production method of the present embodiment and a polarizer (polarization film) that has been produced separately. As the polarizer, it is possible to use appropriate ones through which linearly polarized light among incident natural light is transmissible. For producing such a polarizer, a film composed of an appropriate vinyl alcohol-based polymer of prior art, such as polyvinyl alcohol or partially formalized polyvinyl alcohol, may be subjected to appropriate treatments such as a staining treatment with iodine or a dichroic substance such as a dichroic dye, a stretching treatment and a crosslinking treatment, in an appropriate order and mode. In particular, those that are excellent in light transmittance and polarization degree are preferable as the polarizer. The thickness of the polarizer is generally 5 to 80 μm, but is not limited thereto.

As manner of lamination, the aforementioned stretched films may be laminated on both sides of the polarizer or may be laminated on one side of the polarizer. The number of the laminations is not particularly limited, and two or more may be laminated. Conventionally, a protection film has been laminated on one or both sides of the polarizer. However, by laminating the stretched film of the present embodiment, the stretched film of the present embodiment also acts as a role of a protection film for protecting the polarizer. In this manner, lamination of the stretched film directly on the polarizer realizes omission of one layer of the conventionally used protection film, contributing to reduction in thickness of the display device.

The polarization plate of the present invention may also have another member placed between the stretched film and the polarizer, as long as the property of the present invention is not impaired. Examples of other members placed therebetween may include a protection film for protecting the polarizer. As the protection film, an appropriate transparent film may be used. As such a film, a film composed of the resin that is excellent in transparency, mechanical strength, heat stability and water shielding property is preferable. Examples of the resins for forming the protection film may include acetate resins such as triacetylcellulose; resins having an alicyclic structure; polyolefin resins, polycarbonate resins and polyester resins such as polyethylene terephthalate resins; polyvinyl chloride resins, polystyrene resins, polyacrylonitrile resins, polysulfone resins, polyether sulfone resins, polyamide resins, polyimide resins and acrylic resins.

The polarization plate composed of such laminated films may be produced by a roll-to-roll system in which the stretched film and the polarizer are tightly adhered as the films are each drawn simultaneously from a wound roll of the stretched film, a wound roll of the polarizer and if necessary a wound roll of another film. At the interface on which the obliquely stretched film and the polarizer are tightly adhered, an adhesive agent may be present. An example of the method for tightly adhering the stretched film and the polarizer may be a method in which the stretched film and the polarizer are placed together in a gap between two nip rolls aligned in parallel and pressed with pressure. When three or more layers are laminated, the laminating step may be performed sequentially.

The lengthy stretched film or the lengthy polarization plate are cut out into a desired size suitable for the manner of use, and are used as a phase difference plate or a polarization plate. Cutting may preferably be performed along a direction that is perpendicular or parallel to the taking-up direction of the lengthy film.

Using the stretched film obtained by cutting the lengthy stretched film or the polarization plate obtained by cutting the lengthy polarization plate that are produced using the production methods of the present embodiment, a liquid crystal display device may be produced. One example of the liquid crystal display device may be the one composed of a liquid crystal panel whose polarization transmission axis is changeable by controlling a voltage, and polarization plates disposed sandwiching the liquid crystal panel. The aforementioned stretched film is used as a phase difference plate in the liquid crystal display device, for optical compensation and polarization conversion. The liquid crystal display device of the present embodiment may comprise another member. For example, one or two or more layers of the appropriate members such as a prism array sheet, a lens array sheet, a light diffusion plate, a backlight and a luminance enhancement film may be disposed at appropriate positions. Examples of the backlight may include cold cathode tubes, mercury flat lamps, light emitting diodes and EL.

The liquid crystal display device to which the stretched film or the polarization plate of the present embodiment is applicable is not particularly limited by its display mode. Examples of the display mode may include an in-plane switching (IPS) mode, a vertical alignment (VA) mode, a multi domain vertical alignment (MVA) mode, a continuous pinwheel alignment (CPA) mode, a hybrid alignment nematic (HAN) mode, twisted nematic (TN) mode, a super twisted nematic (STN) mode and an optical compensated bend (OCB) mode. The stretched film or the polarization plate is applicable to all of them.

EXAMPLES

Subsequently, the present invention will be described in more detail with reference to Examples and Comparative Examples, but the present invention is not limited to the following Examples.

Evaluations in Examples are performed in accordance with the following methods.

(1) Orientation Angle

The orientation angle was measured using a polarization microscope BX51 supplied from Olympus Corporation at 5 cm intervals in a width direction of the film, and the mean value of the measured values was taken as the orientation angle θ. The value obtained by subtracting a minimum value from a maximum value in all measured values in the width direction was taken as a fluctuation for evaluation.

(2) Retardation

The retardation was measured using KOBRA-21SDH supplied from Oji Scientific Instruments Co., Ltd., at 5 cm intervals in the width direction, and the mean value of the measured values was taken as the retardation. The value obtained by subtracting the minimum value from the maximum value in all measured values in the width direction was taken as a fluctuation for evaluation.

(3) Nz Coefficient

Nz coefficient was measured using KOBRA-21SDH supplied from Oji Scientific Instruments Co., Ltd. at 5 cm intervals in the width direction, and the mean value of the measured values are taken as an Nz coefficient. The value obtained by subtracting the minimum value from the maximum value in all measured values in the width direction was taken as a fluctuation for evaluation.

(4) θL

Gripping devices opposed at an inlet of a tenter were marked, and when these gripping devices reached an outlet of the tenter (portion at which the interval between them was not changed any more), an angle between a straight line (c) connecting them and a film taking-up direction (D2) was measured and taken as θL.

(5) Stretching Speed V

The value V was obtained by dividing a stretched amount (mm), calculated from a film width before being stretched and a stretching ratio, by a time period required for passage of the film through the stretching zone.

(6) Molecular Weight

Measurement was performed by gel permeation chromatography (GPC) using cyclohexane as a solvent, and the weight average molecular weight (Mw) in terms of standard polyisoprene was obtained.

(7) Durability

A polarization plate having the stretched film as the protection film on one side was prepared. The resulting polarization plate was cut out to be a 5 cm square piece, and this was pasted onto a glass plate via an adhesive agent. Pasting was carried out so that the stretched film of the polarization plate faced the glass plate. The glass plate on which the polarization plate had been pasted was kept at 85° C. for 100 hours, and then a state of the pasted polarization plate was observed and evaluated by the following criteria.

Good: No delamination was observed.

Moderate: The delamination occurred in less than 5% area of the polarization plate.

Poor: The delamination occurred in 5% or more area of the polarization plate.

Example 1

Pellets of a norbornene-based resin (ZEONOR 1420: glass transition point Tg=137° C., weight average molecular weight 30,000, supplied from Zeon Corporation) were dried at 100° C. for 5 hours. The pellets were supplied to an extruder, and melted in the extruder. The melted resin was passed through a polymer pipe and a polymer filter, extruded as a sheet from a T die onto a casting drum, and cooled, to obtain an unstretched film having a thickness of 90 µm and a width of 900 mm.

This unstretched film was delivered to the tenter which is adjusted to a supply angle θi=48° and θL=40°. The rail pattern is adjusted so that the orientation angle θ was 45 degrees under the conditions of the stretching ratio at 2.5 times, the stretching temperature at 142° C., the stretching speed at 2000 mm/min and the take-up tensile force (outlet tensile force) at 300 N/m. Oblique stretching of the film was performed, and both edges of the film were trimmed, to obtain a lengthy stretched film having a width of 1340 mm. The resulting lengthy stretched film was uniform in the width direction and had a good durability. The in-plane retardation (Re), the fluctuation of the retardations, the orientation angle (θ), the fluctuation of the orientation angles, the Nz coefficient, the fluctuation of the Nz coefficients and the durability of the stretched film were shown in Table 1.

Subsequently, a roll of a wound lengthy polarization plate (HLC2-5618S supplied from Sanritz Corporation, thickness 180 µm) whose transmission axis is in the width direction and a roll of the wound stretched film in Example 1 were pasted by a roll-to-roll system to obtain a wound roll of a polarization plate having a width of 1340 mm. A commercially available semi-transmission type liquid crystal display device of a VA (vertical alignment) mode were modified by replacing the and bottom polarization plates with polarization plates cut out from that wound roll, which were installed so that the side on which the stretched film had been pasted was disposed on a side of a liquid crystal cell and slow axes of the stretched film disposed in the top and the bottom were mutually orthogonal. The display property of the resulting liquid crystal display device was visually confirmed from its front face. No color unevenness was observed over the entire width, and the displaying state was good.

Example 2

A stretched film was obtained in the same manner as in Example 1, except that stretching conditions were changed as shown in Table 1, such as θL being set to 42°. The optical property of the resulting stretched film was good as shown in Table 1. A polarization plate and a semi-transmission type liquid crystal display device were obtained using this stretched film in the same manner as in Example 1. The resulting polarization plate had a good durability as shown in Table 1. The displaying property of the resulting liquid crystal display device was good, which was the same as the property observed in Example 1.

Example 3

Before being supplied to the aforementioned tenter for oblique stretching, the unstretched film obtained in Example 1 was subjected to monoaxial lengthwise stretching under conditions of the stretching ratio at 1.2 times and the stretching temperature at 140° C., to obtain a monoaxial lengthwise-stretched film having a thickness of 82 µm and an in-plane retardation Re of 180 nm. The resulting monoaxial lengthwise-stretched film was obliquely stretched under the conditions shown in Table 1 using the aforementioned tenter for the oblique stretching, to obtain a stretched film. The optical property of the resulting stretched film was good as shown in Table 1. Using this stretched film, a polarization plate and a semi-transmission type liquid crystal display device were obtained in the same manner as in Example 1. The durability of the resulting polarization plate was good as shown in Table 1. The display property of the resulting liquid crystal display device was good, which was the same as the property observed in Example 1.

Example 4

Before being supplied to the aforementioned tenter for oblique stretching, the unstretched film obtained in Example 1 was subjected to monoaxial lengthwise stretching under conditions of the stretching ratio at 1.4 times and the stretching temperature at 140° C., to obtain a monoaxial lengthwise-stretched film having a thickness of 76 µm and an in-plane retardation Re of 260 nm. The resulting monoaxial lengthwise-stretched film was obliquely stretched under the conditions shown in Table 1 using the aforementioned tenter for the oblique stretching, to obtain an obliquely stretched film. The optical property of the resulting stretched film was good as shown in Table 1. Using this stretched film, a polarization plate and a semi-transmission type liquid crystal display device were obtained in the same manner as in Example 1. The durability of the resulting polarization plate was good as shown in Table 1. The display property of the resulting liquid crystal display device was good, which was the same as the property observed in Example 1.

Example 5

A stretched film was obtained in the same manner as in Example 1, except that stretching conditions were changed as shown in Table 1, such as stretching speed V being set to 2400 mm/min. The optical property of the resulting stretched film was good as shown in Table 1. Using this stretched film, a polarization plate and a semi-transmission type liquid crystal display device were obtained in the same manner as in Example 1. The durability of the resulting polarization plate was good as shown in Table 1. The display property of the resulting liquid crystal display device was good, which was the same as the property observed in Example 1.

Example 6

A stretched film was obtained in the same manner as in Example 1, except that stretching conditions were changed as shown in Table 1, such as stretching speed V being set to 1100 mm/min. The optical property of the resulting stretched film was good as shown in Table 1. Using this stretched film, a polarization plate and a semi-transmission type liquid crystal display device were obtained in the same manner as in Example 1. The durability of the resulting polarization plate was good as shown in Table 1. The display property of the resulting liquid crystal display device was good, which was the same as the property observed in Example 1.

Comparative Example 1

A stretched film was obtained in the same manner as in Example 1, except that stretching conditions were changed as shown in Table 1, such as θL being set to 44°. The durability of this stretched film was poor.

Comparative Example 2

A stretched film was obtained in the same manner as in Example 1, except that stretching conditions were changed as shown in Table 1, such as stretching speed V being set to a reduced value (800 mm/min). This stretched film had a large fluctuation of the optical property, and a somewhat poor durability.

Comparative Example 3

A stretched film was obtained in the same manner as in Example 1, except that stretching conditions were changed as shown in Table 1, such as stretching speed V being set to an increased value (3000 mm/min). This stretched film had a poor durability.

Comparative Example 4

In the same manner as in Example 3, the unstretched film obtained in Example 1 before being supplied to the aforementioned tenter for the oblique stretch was subjected to monoaxial lengthwise stretching under conditions of the stretching ratio at 1.2 times and the stretching temperature at 137° C., to obtain a monoaxial lengthwise-stretched film having a retardation of 270 nm. The resulting monoaxial lengthwise-stretched film was obliquely stretched under conditions shown in Table 1, such as reduced θL (23°), using the aforementioned tenter for oblique stretching, to obtain an obliquely stretched film. This stretched film had a good durability, although the film had undesirably large fluctuation of the optical property.

The invention claimed is:

1. A method for producing a stretched film comprising:
   supplying a film composed of a thermoplastic resin along a direction that is different from a taking-up direction of a post-stretch film, and
   obliquely stretching the film while transferring the film with the edges thereof being gripped by gripping devices, to produce the stretched film having an orientation angle θ being within 45±1° with respect to the taking-up direction,
   wherein the stretching is performed so that an angle θL (°) and a stretching speed V (mm/min) satisfy the following formulae (1) and (2):

$$\theta-20° \leq \theta L \leq \theta-5° \tag{1}$$

$$1000 \text{ mm/min} < V \leq 2500 \text{ mm/min} \tag{2}$$

wherein the angle θL is an angle between two directions, one of which is along a straight line connecting a pair of the gripping devices when they are at a stretching completion point, the pair of the gripping devices having been opposed to each other along a direction that is approximately perpendicular to a film supplying direction when the pair has been at a point of film gripping commencement by the gripping devices, and the other of which is a direction perpendicular to the taking-up direction.

TABLE 1

| | Supplying angle (°) | θL (°) | Ratio (times) | Stretching conditions Stretching temperature (° C.) | Stretching speed V (mm/min) | Take-up tensile force T (N/m) | Thickness after stretching (µm) | Orientation angle θ (°) | Orientation angle θ variation (°) | Re (nm) | Re variation (nm) | Nz coefficient (—) | Nz coefficient variation | Durability |
|---|---|---|---|---|---|---|---|---|---|---|---|---|---|---|
| Ex. 1 | 48 | 40 | 2.5 | 142 | 2000 | 300 | 36 | 45 | 0.7 | 140 | 3 | 1.10 | 0.08 | Good |
| Ex. 2 | 48 | 42 | 2.8 | 143 | 2000 | 300 | 36 | 45 | 0.7 | 140 | 3 | 1.05 | 0.08 | Good |
| Ex. 3 | 43 | 32 | 2.1 | 140 | 2000 | 100 | 40 | 45 | 0.6 | 140 | 3 | 1.50 | 0.07 | Good |
| Ex. 4 | 40 | 26 | 1.8 | 138 | 2000 | 300 | 36 | 45 | 0.6 | 140 | 3 | 1.60 | 0.08 | Good |
| Ex. 5 | 43 | 40 | 2.5 | 142 | 2400 | 100 | 36 | 45 | 0.8 | 140 | 4 | 1.50 | 0.08 | Good |
| Ex. 6 | 43 | 40 | 2.5 | 139 | 1100 | 100 | 36 | 45 | 0.8 | 140 | 4 | 1.50 | 0.08 | Good |
| Comp. Ex. 1 | 48 | 44 | 2.5 | 142 | 2000 | 100 | 36 | 45 | 0.7 | 140 | 4 | 1.10 | 0.07 | Poor |
| Comp. Ex. 2 | 48 | 40 | 2.5 | 142 | 800 | 100 | 36 | 45 | 1.3 | 140 | 6 | 1.10 | 1.20 | Moderate |
| Comp. Ex. 3 | 48 | 40 | 2.5 | 143 | 3000 | 300 | 36 | 45 | 0.8 | 140 | 4 | 1.10 | 0.08 | Poor |
| Comp. Ex. 4 | 40 | 23 | 2.0 | 138 | 2000 | 300 | 41 | 45 | 1.2 | 140 | 7 | 1.60 | 1.4 | Good |

As described above, the present invention has been described in relation to the embodiments thought to be the most practical and preferable at the present moment, although it is to be understood that the present invention is not limited to the embodiments disclosed herein, appropriate changes are possible without going against the gist or the thought of the present invention read-in from claims and the entire specification. It should be understood that a method for producing a stretched film, a stretched film, a polarization plate and a liquid crystal display device having such a change are included in the technical scope of the present invention.

The present invention relates to the subject matter contained in the Japanese patent application number 2007-248699 submitted on Sep. 26, 2007, and all of its disclosure are apparently incorporated herein by reference.

2. The method for producing the stretched film according to claim 1, wherein a weight average molecular weight of said thermoplastic resin is 15,000 to 50,000.

3. The method for producing the stretched film according to claim 1, wherein the stretched film has an in-plane retardation Re of 100 to 300 nm.

4. A method for producing a polarization plate by laminating the stretched film produced by the method according to claim 1 on at least one side of a polarizer by a roll-to-roll system.

5. The method for producing the stretched film according to claim 1, wherein θ and θL satisfy the following formula (1'):

$$\theta-15° \leq \theta L \leq \theta-5° \tag{1'}$$

6. The method for producing the stretched film according to claim 1, wherein the obliquely stretching results in a stretching ratio of W/W0 of 1.3 to 3.0, wherein W0 and W represent the width of the film before and after being obliquely stretched, respectively.

7. The method for producing the stretched film according to claim 1, wherein a stretching temperature in the obliquely stretching is in the range of Tg to Tg+30° C. wherein Tg is the glass transition temperature of the thermoplastic resin.

8. The method for producing the stretched film according to claim 1, wherein a saturated water absorption ratio of the stretched film is 0.03% by weight or less.

* * * * *